(12) United States Patent  (10) Patent No.: US 7,770,112 B2
Iwakura et al.  (45) Date of Patent: Aug. 3, 2010

(54) DATA CONVERSION METHOD AND APPARATUS TO PARTIALLY HIDE DATA

(75) Inventors: Tomoya Iwakura, Kawasaki (JP); Junko Furukawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1026 days.

(21) Appl. No.: 11/450,403

(22) Filed: Jun. 12, 2006

(65) Prior Publication Data

US 2007/0220609 A1 Sep. 20, 2007

(30) Foreign Application Priority Data

Mar. 14, 2006 (JP) .............................. 2006-069048

(51) Int. Cl.
*G06F 17/00* (2006.01)
(52) U.S. Cl. .......................... 715/271; 726/29; 715/255
(58) Field of Classification Search ................. 715/271, 715/255; 726/26–30
See application file for complete search history.

(56) References Cited

U.S. PATENT DOCUMENTS

| 6,442,576 | B1 * | 8/2002 | Edelman et al. | 715/234 |
|---|---|---|---|---|
| 2002/0152265 | A1 * | 10/2002 | Felman | 709/203 |
| 2003/0033432 | A1 * | 2/2003 | Simpson et al. | 709/246 |
| 2004/0073621 | A1 * | 4/2004 | Sampson | 709/209 |
| 2006/0010103 | A1 * | 1/2006 | Malik | 707/3 |
| 2007/0203776 | A1 * | 8/2007 | Austin et al. | 705/8 |

FOREIGN PATENT DOCUMENTS

JP 06-348808 12/1994

OTHER PUBLICATIONS

"Convert Text to Images to Protect your Email from Search Bots", May 5, 2005, http://www.quickonlinetips.com/archives/2005/05/mask-email-image-generator-convert-text-to-images-to-protect-your-email-from-search-bots/.*
Masayuki Asahara et al., "Japanese Named Entity Extraction with Redundant Morphological Analysis", Proceedings of Human Language Technology and North American Chapter of Association for Computational Linguistics (HLT-NAACL), Main Papers, May 2003, pp. 8-15.

* cited by examiner

*Primary Examiner*—Adam M Queler
(74) *Attorney, Agent, or Firm*—Fujitsu Patent Center

(57) ABSTRACT

This invention provides a technique to correctly inform the human being of content of contents to be published but to prevent machines from collecting part of the contents whose distribution is not desired by the information provider. This invention includes: reading out contents data to be published, which includes text data, and identifying a character string whose output as the text data should be avoided from the contents data; converting the identified character string into substitution data other than the text data so as to maintain content of the identified character string; and generating publication contents data to maintain publication content of the contents data by using data other than the identified character string in the contents data and the substitution data. Thus, by carrying out such a processing, it becomes possible to conceal the character string against machines without changing the publication content for the human being.

9 Claims, 7 Drawing Sheets

FIG.3A    CONTACT ADDRESS OF TARO YAMADA IS:
hoge@hoge.com

FIG.3B    CONTACT ADDRESS OF [TARO YAMADA] IS:
[hoge@hoge.com]

FIG.3C    CONTACT ADDRESS OF [*TARO YAMADA*] IS:
[hoge@hoge.com]

FIG.3D    CONTACT ADDRESS OF TA[RO] [YAMA]DA IS:
[hoge]@hoge.com

CONTACT ADDRESS OF LINK1
LINK2

FIG.4

FIG.5A CONTACT ADDRESS OF TARO YAMADA IS<BR>
hoge.com<BR>

FIG.5B CONTACT ADDRESS OF<IMG SRC="20060213001.GIF"><BR>
<IMG SRC="20060213002.GIF"><BR>

FIG.5C CONTACT ADDRESS OF TA<IMG SRC="20060213001.GIF"><IMG SRC="20060213002.GIF">DA<BR>
<IMG SRC="20060213003.GIF">@hoge.com<BR>

FIG.5D CONTACT ADDRESS OF<A HREF="20060213001.WAV">LINK1</A><BR>
<A HREF="20060213002.WAV">LINK2</A><BR>

DATA CONVERSION METHOD AND APPARATUS TO PARTIALLY HIDE DATA

TECHNICAL FIELD OF THE INVENTION

This invention relates to a technique to hide part of content data to be published against machines.

BACKGROUND OF THE INVENTION

The spread of the Internet enables people to access various information through Web pages. Search engines heavily contribute to such accesses to the information. The search engines automatically collect (i.e. clone) information dispersively held in the Internet to generate indexes for collected information, and provides them for information searchers. Because an information provider side's object of opening information on the Web pages to the public is to distribute and deliver the information, it is basically preferable that the search engines clone the information to generate indexes for it. Commercially, there is a case where the competition to obtain the higher ranking in the search engine is carried out for a specific keyword.

However, the Web pages include contents provided to be intrinsically opened to the public and information to be collaterally opened to the public, such as information concerning an origin of the contents or a contact address. There is no problem that the contents provided to be intrinsically opened to the public are cloned by the search engines. However, when the information concerning the origin of the contents or the contact address is cloned, there is a case where a problem occurs. For example, although there is a case where a mail address as the information concerning the contact address is opened to the public, the mail address may be cloned for the target of the spam mail. In addition, also as for the information concerning the origin of the contents, when the name and address are cloned, they may be used for various crimes. Other information may include data that is not preferable for allowing machines such as the search engines to clone it and allowing the secondary use of it.

Therefore, as the countermeasure for the mail address, there is a case where a method of converting hoge@hoge.com, which is an example of the mail address, into a character string such as "hoge at hoge dot com", or a method of inserting spaces is adopted. However, although such methods can be adopted for the mail address or telephone number, there is no method of converting information such as the name or address, and incorrect information may be distributed.

In addition, for example, JP-A-H6-348808 discloses a technique to output all index information including index information for a secret document, important document or the like on a index sheet so as to easily understand it, and to enable the confidentiality to be held. Specifically, the index information and image data of the document are read out from a storage medium to check whether or not a specific character string is included in the image information or it has a special file attribute. When either condition is satisfied, a special pattern such as a character pattern "secret" or "important" is synthesized into the index image or only the special pattern instead of the index image is expanded and disposed onto an output buffer, and the data is sent to a printer to form image onto a paper. Therefore, the index sheet is output. This technique outputs the special pattern for data whose secrecy has to be held. However, it cannot convert the data whose secrecy has to be held into data that can be recognized by the human being but cannot be recognized by machines.

As described above, it is impossible for the conventional technique to correctly inform the human being of content of the contents but to prevent from cloning and secondarily using part of the contents whose distribution is not desired by the information provider.

SUMMARY OF THE INVENTION

Therefore, an object of this invention is to provide a technique to correctly inform the human being of content of the contents but to prevent machines from collecting part of the contents whose distribution is not desired by the information provider.

A data conversion method according to this invention includes: reading out contents data to be processed from a contents data storage storing the contents data to be published, which includes text data, and identifying a character string whose output as the text data should be avoided from the contents data; converting the identified character string into substitution data other than the text data so as to maintain content of the identified character string; and generating publication contents data to maintain publication content of the contents data by using data other than the identified character string in the contents data and the substitution data, and storing the generated publication contents data into a storage device.

Thus, by converting a character string whose output as the text data should be avoided (in the aforementioned example, a mail address, telephone number, address, name or the like) into the substitution data (e.g. image data or voice data representing the character string or the like) other than the text data, it becomes possible to conceal the character string against machines without changing the publication content for the human being.

Incidentally, the aforementioned reading and identifying may include extracting personal information having a predetermined type. As described above, it becomes possible to prevent from distributing the personal information, unnecessarily. Incidentally, there is a case where not only the personal information, but also a price or other information is extracted.

Similarly, the reading and identifying may include extracting at least a part of a character string having a predetermined type. For example, there is a case where a similar effect can be obtained not by converting all characters of the name into the substitution data, but by converting only a part of them into the substitution data.

In addition, when the substitution data is image data representing the identified character string, the image data may include an image having cursive or irregular fonts corresponding to characters included in the identified character string. For example, even if an Optical Character Recognition (OCR) technique is used in the search engine or the like, it is impossible to recognize the characters included in the image having such cursive or irregular fonts.

Furthermore, the aforementioned publication contents data may include reference data to the aforementioned substitution data. For example, in a case of a Hyper Text Markup Language (HTML) file, a link to the image file or voice file may be included. Incidentally, the image file may be displayed on the same Web page or may be displayed in another window.

Furthermore, the aforementioned publication contents data may be data to display a combination of data other than the identified character string in the contents data and the substitution data. It is possible to display the image as the substitution data on the same Web page by using an IMG tag in the HTML file, and to substitute an image for partial data in a Portable Document Format (PDF) file. In such cases, it is impossible for machines to easily recognize the character string represented by the image data portion.

In addition, the invention may further include: judging whether a transmission source of a contents data request is registered in a publication refusal list or is not registered in a publication approval list when the contents data request is received; when it is judged that the transmission source of the contents data request is registered in the publication refusal list or is not registered in the publication approval list, transmitting the publication contents data stored in the storage device to the transmission source of the contents data request; and when it is judged that the transmission source of the contents data request is not registered in the publication refusal list or is registered in the publication approval list, transmitting the contents data stored in the contents data storage to the transmission source of the contents data request. Thus, the publication contents data is output to an accessing source, to which the publication of the identified character string is not desired by the information provider.

Incidentally, it is possible to create a program for causing a computer to execute this method according to the present invention. The program is stored into a storage medium or a storage device such as, for example, a flexible disk, a CD-ROM, a magneto-optical disk, a semiconductor memory, or a hard disk. In addition, the program may be distributed as digital signals over a network in some cases. Data under processing is temporarily stored in the storage device such as a computer memory.

BRIEF DESCRIPTION OF THE DRAWINGS

FIG. 3A is a diagram showing a display example of normal contents, and FIG. 3B to FIG. 3D are diagrams showing display examples of the substitution contents;

FIG. 4 is a diagram showing another display example of the substitution contents;

FIG. 5A is a diagram showing an example of an HTML file of normal contents, and FIG. 5B to FIG. 5D are diagrams showing an HTML file in a case of the substitution contents;

DETAILED DESCRIPTION OF THE PREFERRED EMBODIMENTS

Embodiment 1

Figure 1:
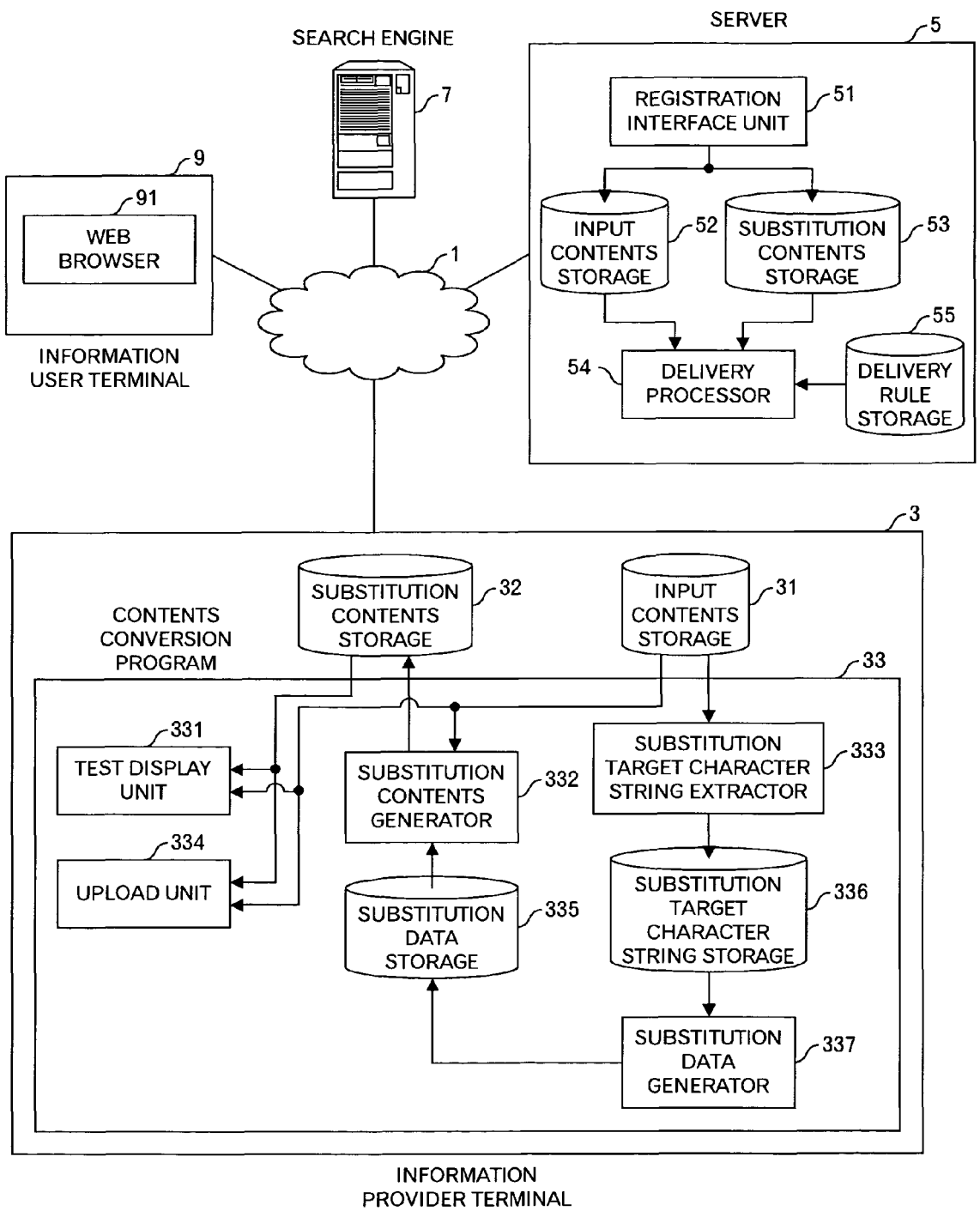
FIG. 1 is a diagram to explain a system outline according to a first embodiment of this invention.
Figure 2:
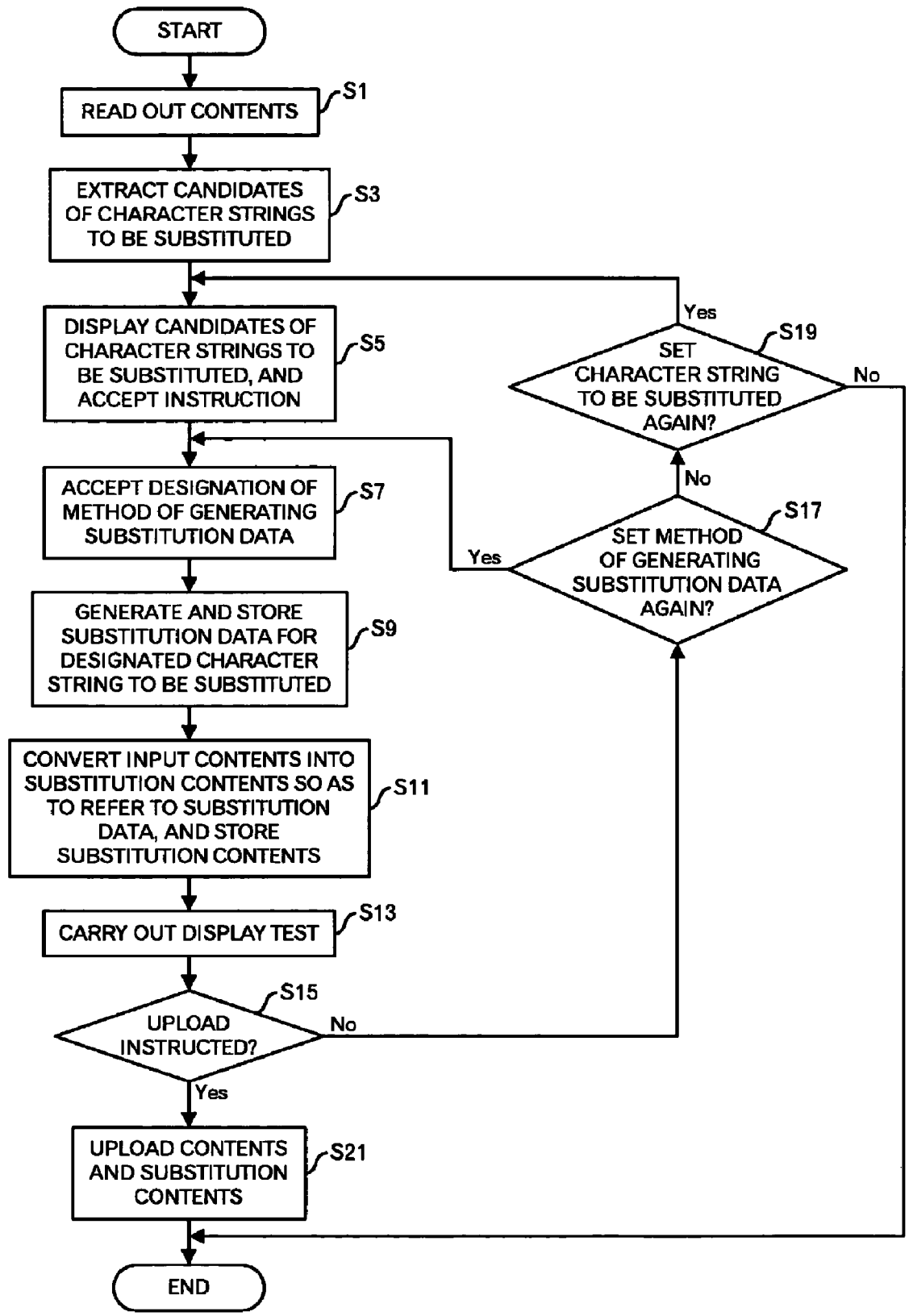
FIG. 2 is a diagram showing a processing flow in an information provider terminal according to the first embodiment of this invention.

FIG. 1 shows an outline figure of a system according to a first embodiment of this invention. A network 1 is connected to a server 5, a search engine 7, one or plural information user terminals 9, which are personal computers, for example, and execute a Web browser 91, and an information provider terminal 3.

The information provider terminal 3 has an input contents storage 31 storing contents that the information provider creates by using a contents creation program such as an HTML file creation program, a substitution contents storage 32 storing substitution contents that are data to present a character string(s) whose output as text data should be avoided in the contents and which is converted into other data, and a contents conversion program 33 to carry out a main processing in this embodiment. The contents conversion program 33 has a substitution target character string extractor 333 that carries out a processing to extract a character string to be substituted, from contents stored in the input contents storage 31; a substitution target character string storage 336 that stores the character string to be substituted, which was identified by the substitution target character string extractor 333; a substitution data generator 337 that generates substitution data from the character string to be substituted, which is stored in the substitution target character string storage 336; a substitution data storage 335 that stores the substitution data generated by the substitution data generator 337; a substitution contents generator 332 that generates substitution contents that are provided, in order to hide the character sting to be substituted, in response to an access by a machine such as the search engine 7, by using the substitution data stored in the substitution data storage 335 and the contents stored in the input contents storage 31; a test display unit 331 that carries out a test display processing of the contents stored in the input contents storage 31 and the substitution contents stored in the substitution contents storage 32, in response to, for example, an instruction from the information provider; and an upload unit 334 that uploads the contents stored in the input contents storage 31 and the substitution contents stored in the substitution contents storage 32, to the server 5, in response to, for example, an instruction from the information provider.

In addition, the server 5 has a registration interface unit 51 that carries out an authentication processing and the like and receives data uploaded from the information provider terminal 3 when the authentication processing and the like are successfully completed; an input contents storage 52 that stores contents data received from the information provider terminal 3 by the registration interface unit 51; a substitution contents storage 53 that stores the substitution contents data received from the information provider terminal 3 by the registration interface unit 51; a delivery rule storage 55 that stores data that is a delivery rule to judge whether the normal contents data should be delivered in response to an access via the network 1 or the corresponding substitution contents should be delivered; and a delivery processor 54 that delivers the normal contents data or the substitution contents data to a requesting source according to the delivery rule stored in the delivery rule storage 55 in response to an access via the network 1.

The delivery rule storage 55 stores a list of IP addresses of devices to which the substitution contents should be delivered when it is requested. On the other hand, there is a case where a list of IP addresses of the devices to which the contents should be delivered or attributes (e.g. types of browsers) of requesting sources that are devices to which the contents should be delivered.

Next, a processing content of a system shown in FIG. 1 will be explained with reference to FIG. 2 to FIG. 6. First, the substitution target character string extractor 333 in the contents conversion program 33 of the information provider terminal 3 reads out contents data from the input contents storage 31 (step S1). Then, it extracts candidates of the character strings to be substituted such as proper noun or the like (step S3). The character string to be substituted, which should be extracted, is, basically, information to be hidden for machines, and includes personal information such as a name, address, telephone number and mail address. Data of other types may be extracted. Although not shown in figure, a dictionary for character strings to be extracted such as the proper noun may be referenced. For example, a technique of extracting the proper noun (for example, see Masayuki Asahara and Yuji Matsumoto, "Japanese named entity extraction with redundant morphological analysis", In Proc. Human Language Technology and North American Chapter of Association for Computational Linguistics (HLT-NAACL), pp. 8-15, May 2003) may be used. In addition, as a technique of extracting the telephone number, a method of extracting it by implementing rules using a character string processing function by a normal expression in a language such as Perl and Rudy may be used. The rule may be "O&d{2}-&d{3}-&d{4}", for example. Here, &d means it matches any number, and the number between {and} represents the number of repeats. Therefore, by using the aforementioned rule, the number such as 012-345-6789 can be extracted.

Then, the substitution target character string extractor 333 displays the candidates of the character strings to be substituted on a display device, accepts selection of a candidate(s) of a character string(s) or designation of a specific character string(s), and stores the selected character string(s) or designated character string(s) into the substitution target character string storage 336 (step S5). The information provider selects a proper character string(s) among the displayed candidates, or designates a specific character string(s) to be substituted instead of the displayed candidates or in addition to them. For example, in a case of contents as shown in FIG. 3A, "Taro Yamada" and "hoge@hoge.com" are identified as the character strings to be substituted, and they are stored in the substitution target character string storage 336.

Next, the substitution data generator 337 presents methods of generating the substitution data such as (a) the entire of the character strings to be substituted is converted into an image, (b) a portion (every second characters, every third characters or only designated characters or the like), or (c) the character string to be substituted is converted into voice data, to the information provider, and accepts designation of a method of generating the substitution data or the like from the information provider (step S7). For example, in the example of FIG. 3A, when "Taro Yamada" and "hoge@hoge.com" are entirely converted into an image, a display as shown in FIG. 3B, for example, is carried out. Incidentally, FIG. 3B shows a simple image generation, and when the search engine 7 has an OCR function, there is a case where the OCR function is applied to the image to identify a character string in the image. In order to cope with such a case, as shown in FIG. 3C, it is possible that an Italic font is used, the size of the font varies in the character string, a bold font is used, the color of the font varies in the character string, the type of the font is changed, or an irregular or cursive font is used. By adopting such a complicated image conversion, even if an access from the search engine 7 having the OCR function is received, it cannot read out the characters, correctly, and it becomes possible to securely achieve an object of hiding the character string against the aforementioned machine.

Furthermore, when part of the character string to be substituted is converted into an image, an image as shown in FIG. 3D is displayed, for example. That is, characters "Yama", characters "ro", and characters "hoge" are converted into images. Thus, it is impossible to easily identify such characters, and character strings "Taro Yamada" and "hoge@hoge.com" cannot be identified by the machine. When only a part of characters is converted into images, it is possible for the information provider to designate the characters to be converted, or to designate a method of selecting characters such as a method of selecting every second character or a method of selecting every third character. Furthermore, it is possible to previously set a method of selecting every second character, for example, and to automatically process the characters according to such a method.

When the character strings to be substituted is converted into voice data, the voice data is generated by using a voice synthesis function. Incidentally, because, in a case of the voice data, it is impossible to display the data, a display as shown in FIG. 4, for example, is carried out to cause the information user to click a link, by which the voice should be reproduced, of a link 1 to reproduce the voice "Taro Yamada" and a link 2 to reproduce the voice "hoge@hoge.com". According to the normal Web browser's function, it is possible to activate a necessary program to reproduce the voice data.

Next, the substitution data generator 337 generates the substitution data for the designated character string(s) to be substituted according to the substitution data generation method designated by the information provider, and stores the substitution data into the substitution data storage 335 (step S9). As described above, the image data or voice data is generated. Incidentally, the voice data or image data is stored into the substitution data storage 335 so as to identify the original character string. For example, the original character string is used for the name of the directory, and the date and time are used for the file name.

Then, the substitution contents generator 332 uses the contents stored in the input contents storage 31 and the substitution data stored in the substitution data storage 335 to generate the substitution contents by converting the input contents so as to refer to the substitution data, and stores the substitution contents into the substitution contents storage 32 (step S11). For example, when the contents stored in the input contents storage 31 correspond to an HTML file as shown in FIG. 5A, the contents are converted into an HTML file as shown in FIG. 5B so as to cause to carry out a display as shown in FIG. 3B and FIG. 3C. That is, in order to display the image data, the character string "Taro Yamada" is converted into an IMG tag to read the image file for "Taro Yamada", and the character string "hoge@hoge.com" is converted into an IMG tag to read the image file for "hoge@hoge.com". Thus, the portion other than the character strings to be substituted is the same, and as for the character strings to be substituted, the substitution data is referenced by the IMG tag. Incidentally, the image data is disposed in the same directory as that of the HTML file. Thus, the character string cannot be identified from the file name.

In addition, in order to cause to carry out a display as shown in FIG. 3D, the contents are converted into the HTML file as shown in FIG. 5C. That is, in order to display the image data for part of the character string, the characters "Yama" are converted into an IMG tag to read an image file for "Yama", and the characters "ro" are converted into an image file for "ro", and further the characters "hoge" are converted into an image for "hoge".

Furthermore, in order to cause to carry out a display as shown in FIG. 4, the contents are converted into an HTML file as shown in FIG. 5D. That is, the character string "Taro Yamada" is substituted with an A tag to refer to a voice file for "Taro Yamada" and a character string "link 1", and further the character string "hoge" is substituted with an A tag to refer to a voice file for "hoge" and a character string "link2". In this case, because the voice files cannot be presented within the HTML file, hyperlinks are embedded into the HTML file.

The substitution contents generator 332 stores the generated HTML file and the image file(s) or the voice file(s) into the substitution contents storage 32.

Next, the test display unit 331 carries out a test display, for example, so as to arrange the contents stored in the input contents storage 31 and the substitution contents stored in the substitution contents storage 32 in the horizontal or vertical direction (step S13). For example, a display as shown in FIG. 3A and a display as shown in FIG. 3B are arranged and displayed to cause the information provider to compare them and to confirm whether or not the intended displays are carried out.

Here, the contents conversion program 33 judges whether or not an upload instruction is input from the information provider (step S15), and when the upload instruction is input, namely, when it is judged that the intended displays are realized by the substitution contents, the upload unit 334 uploads the contents stored in the input contents storage 31 and the substitution contents stored in the substitution contents storage 32 (step S21). Then, the processing at the side of the information provider terminal 3 is completed. Incidentally, the registration interface unit 51 of the server 5 carries out an authentication processing for the information provider terminal 3, and when the authentication is successfully completed, it stores the contents received from the information provider terminal 3 into the input contents storage 52, and the substitution contents received from the information provider terminal 3 into the substitution contents storage 53.

On the other hand, when the intended display is not realized by the substitution contents, the contents conversion program 33 causes the information provider to designate either (a) setting a method of generating the substitution data or the like again, (b) setting the character string(s) to be substituted again, or (c) terminating this processing. Then, when the method of generating the substitution data is set again (step S16: Yes route), the processing returns to the step S7. On the other hand, when the method of generating the substitution data is not set again (step S17: No route), but the character string(s) to be substituted is set again (step S19: Yes route), the processing returns to the step S5. On the other hand, when the termination of the processing is instructed (step S19: No route), the processing in the information provider terminal 3 is terminated.

When the aforementioned processing is carried out, it becomes possible to convert the character string(s) to be hidden against the machine such as the personal information in a format intended by the information provider.

Figure 6:
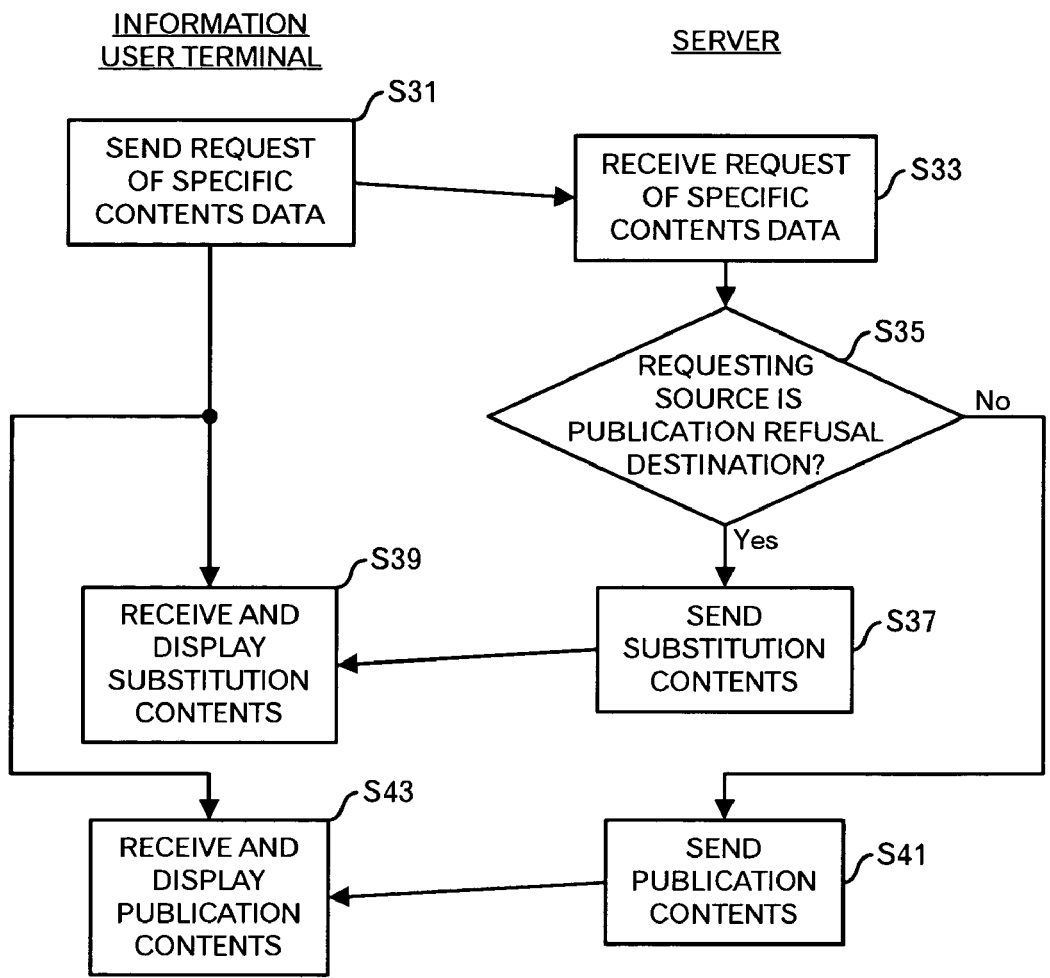
FIG. 6 is a diagram showing a processing flow of a delivery processing according to the first embodiment of this invention.

Next, a processing when the server 5 receives an access to request the contents will be explained with reference to FIG. 6. For example, the Web browser 91 of the information user terminal 9 transmits a request of specific contents data (contents data on a specific Uniform Resource Locator (URL)) according to the instruction from the information user (step S31). The delivery processor 54 of the server 5 receives the request of the specific contents data (step S33), refers to the delivery rule storage 55, and judges whether or not the requesting source is designated as a publication refusal destination (step S35). For example, the IP addresses of the publication refusal destinations or the like are defined every URL or every information provider in the delivery rule storage 55. Not the IP addresses but the types of browsers may be defined, for example. For example, the IP address of the search engine 7 is registered as the IP address of the publication refusal destination in the delivery rule storage 55. Incidentally, the IP addresses of the publication approval destinations may be defined in the delivery rule storage 55.

If the requesting source is the publication refusal destination, the delivery processor 54 reads out the substitution contents data, which corresponds to the requested specific contents data and is stored in the substitution contents storage 53, and transmits the read substitution contents data to the information user terminal 9 of the requesting source as the publication refusal destination (step S37).

The Web browser 91 of the information user terminal 9 as the publication refusal destination receives the substitution contents from the server 5 and displays it on a display device (step S39). In such a case, a display as shown in FIG. 3B to FIG. 3D or FIG. 4 is carried out. Even in this case, when the human being watches it, content of the contents can be understood. However, the machine cannot recognize the character string(s) to be substituted.

On the other hand, when the requesting source is not the publication refusal destination, the delivery processor 54 reads out the requested specific contents data, namely, the normal contents data from the input contents storage 52, and transmits the read contents data to the information user terminal 9 as the requesting source (step S41). The Web browser 91 of the information user terminal 9 receives the normal contents data and displays it on the display device (step S43). For example, the display as shown in FIG. 3A is carried out. In such a case, the secondary use of the character string(s) to be substituted is possible.

Incidentally, in the case of FIG. 4, the information user needs to click the character string "link 1" or the character string "link 2" displayed on a window of the Web browser 91 or both of them to activate a voice reproduction program and downloads the voice file from the server 5, and to cause the voice reproduction program to reproduce the voice file.

According to such an embodiment, because appropriate substitution contents are generated according to an intension of the information provider, and further it is judged at the side of the server 5 whether or not the requesting source is the publication refusal destination, it becomes possible to deliver the substitution contents to an improper information user or the normal contents to a proper information user.

Incidentally, it is also possible to deliver a different type of substitution contents according to attributes of the requesting sources by generating the substitution contents according to plural methods of generating the substitution data and storing plural types of substitution contents in the server 5.

Embodiment 2

In the aforementioned example, the information provider generates the substitution contents in advance and uploads them to the server 5. However, it is possible to generate only the normal contents at the information provider side and to generate the substitution contents at the server side in advance or dynamically.

In the following, an embodiment when the substitution contents are generated at the server side will be explained with reference FIG. 7 and FIG. 8. The network 1 such as the Internet is connected to one or plural information user terminals 9 that execute a Web browser 91; a search engine 7; a server 501 that carries out a main processing in this embodiment; and an information provider terminal 301 that executes an HTML file generation program.

The server 501 in this embodiment includes a registration interface unit 551 that carries out an authentication processing for the information provider terminal 301, and receives the normal contents data uploaded from the information provider terminal 301 when the authentication processing is successfully completed; an input contents storage 552 that stores the normal contents data that the registration interface unit 551 received from the information provider terminal 301; an extraction rule storage 554 that stores an extraction rule to extract the character string(s) to be substituted; a substitution target character string extractor 553 that extracts the character string(s) to be substituted, from the contents stored in the input contents storage 552 according to data stored in the extraction rule storage 554; a substitution target character string storage 555 that stores the character string(s) extracted by the substitution target character string extractor 553; a substitution data generator 556 that generates substitution data in a predetermined type from the character string(s) to be substituted, which is stored in the substitution target character string storage 555; a substitution data storage 557 that stores the substitution data generated by the substitution data generator 557; a substitution contents generator 558 that generates substitution contents provided in order to conceal the character string(s) to be substituted against an access from machines such as the search engine 7 by using the substitution data stored in the substitution data storage 557 and the normal contents data stored in the input contents storage 552; a substitution contents storage 559 that stores the substitution contents generated by the substitution contents generator 558; a delivery rule storage 561 that stores IP addresses of publication refusal destinations or publication approval destinations; and a delivery processor 560 that delivers either the normal contents stored in the input contents storage 552 or substitution contents stored in the substitution contents storage 559 to the requesting source based on the data of the publication refusal destinations or the publication approval destinations stored in the delivery rule storage 561.

The information provider operates the information provider terminal 301 to upload the created contents data to the server 501. The registration interface unit 551 carries out the authentication processing for the information provider terminal 301, and when the authentication is successfully completed, it stores the uploaded contents data into the input contents storage 552. The subsequent processing will be explained with reference to FIG. 8. Incidentally, a processing in FIG. 8 may be carried out in advance, and in such a case, the processing flow in FIG. 6 of the first embodiment is carried out as it is. On the other hand, the processing in FIG. 8 may be carried out when a request of specific contents data is received, and in such a case, for example, the processing in FIG. 8 maybe dynamically carried out between the step S35 and step S37 in FIG. 6. In this case, the method of generating the substitution data may be changed in accordance with the requesting source.

First, the substitution target character string extractor 553 reads out the contents data from the input contents storage 552 (step S51). Then, it extracts character string(s) to be substituted such as a proper noun from the contents data according to the extraction rule stored in the extraction rule storage 554 in advance for each information provider or each contents, and stores the character string(s) to be substituted into the substitution target character string storage 555 (step S53). Basically, this processing is the same as the step S3, but, the character string(s) to be substituted is not presented to the information provider as candidate(s), here.

Next, the substitution data generator 337 generates substitution data for the character string(s) to be substituted, which is stored in the substitution target character string storage 555, according to a predetermined method among methods of generating the substitution data such as (a) the entire of the character strings to be substituted is converted into an image, (b) a portion (every second characters, every third characters or only designated characters or the like is converted into an image), or (c) the character string to be substituted is converted into voice data, and stores the generated substitution data into the substitution data storage 557 (step S55). Image data or voice data is generated for the character string(s) to be substituted. Basically, this processing is the same as the step S9, and as for the method of generating the substitution data, the predetermined method is used. As for the method of generating the substitution data, the information provider may set it in advance or a manager of the server 501 may set it.

Then, the substitution contents generator 558 uses contents stored in the input contents storage 552 and the contents data stored in the substitution data storage 557, and converts the input contents so as to refer to the substitution data to generate substitution contents, and stores the substitution contents into the substitution contents storage 559 (step S59). Basically, this step is the same as the step S11.

By carrying out the aforementioned processing, it becomes possible to convert the character string(s) to be hidden against the machine such as the personal information into the image or voice at the server side. That is, it becomes possible to prevent the secondary use of the personal information or the like, which the information provider does not intend. Even if the requesting source is the publication refusal destination, content of the character string(s) to be hidden can be recognized by eyes or ears when the requesting source is the human being.

Especially, it is possible to prevent a case where the mail address, which was automatically extracted by the search engine, is used for a transmission destination of the spam mail. Furthermore, it is possible to hold the two-sidedness that information, which may be incorrectly informed when other expression is carried out, such as a name and address, is hidden against the machine, but the human being can recognize such information.

Although the embodiments of this invention were explained, this invention is not limited to these embodiments. That is, not only the personal information but also other type of character strings may be designated as character strings to be hidden against the machine.

In the aforementioned example, the substitution contents are generated in the information provider terminal or server. However, the generation of the substitution contents may be carried out in other computers (proxy, terminal or the like) on the network. In addition, when the substitution data is a voice file, there is a case where the voice data can be embedded into the same file.

Figure 7:
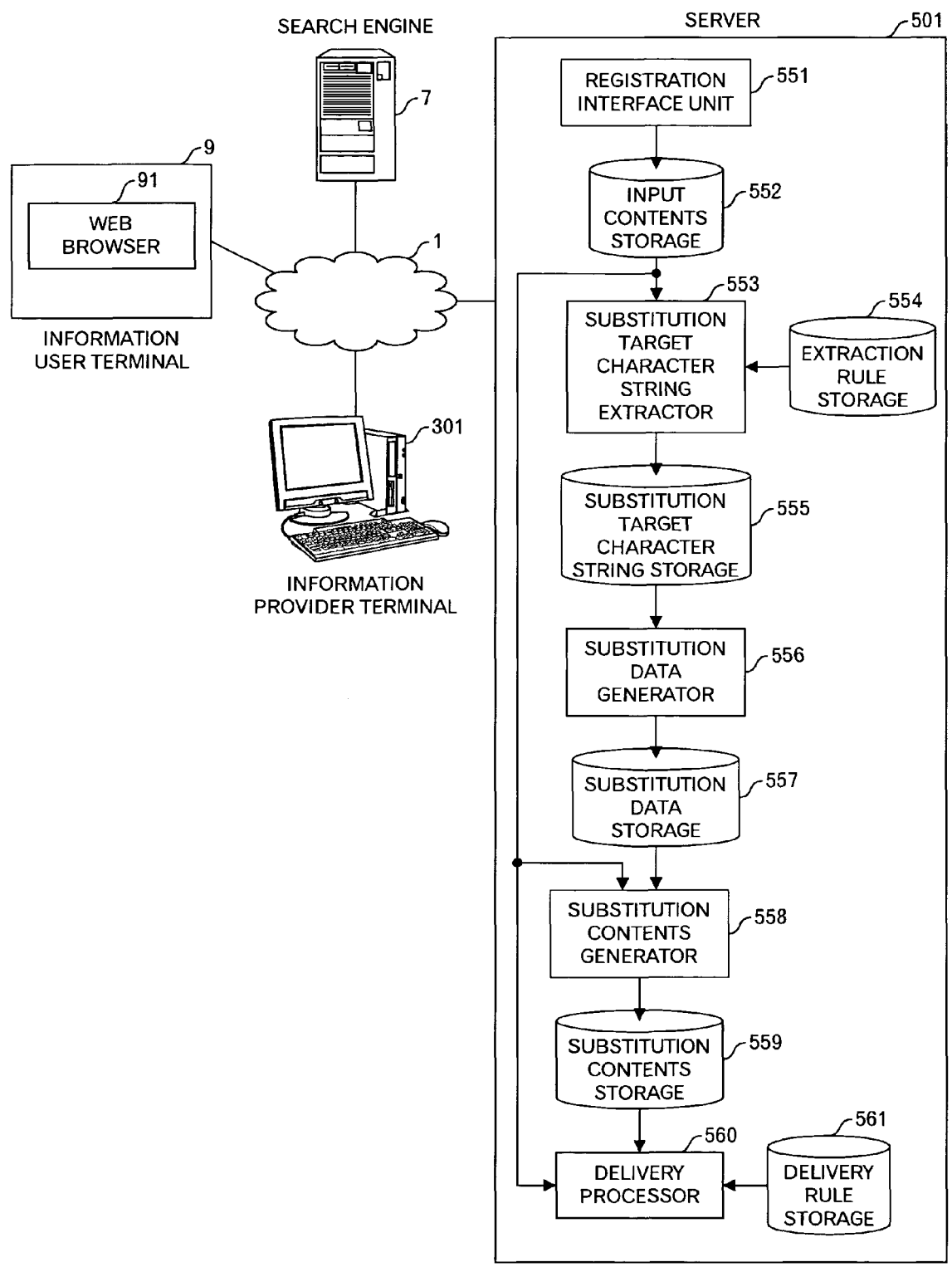
FIG. 7 is a diagram showing a system outline according to a second embodiment of this invention.
Figure 8:
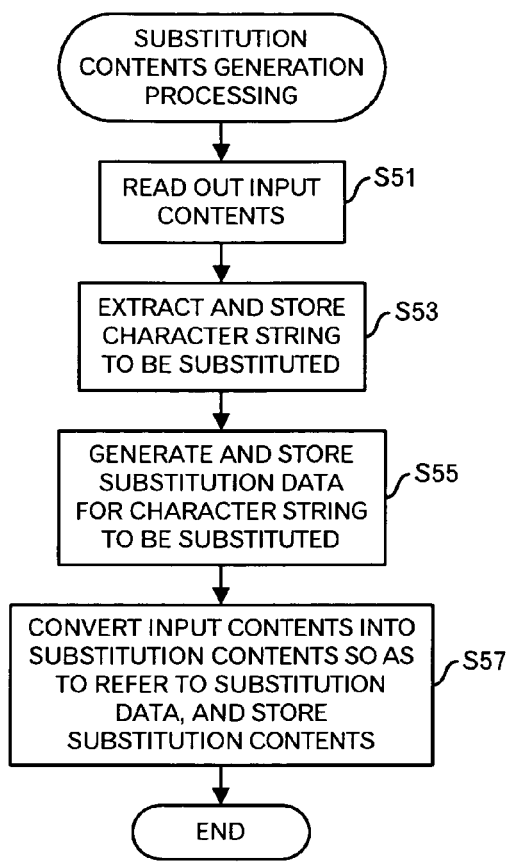
FIG. 8 is a diagram showing a processing flow of a server according to the second embodiment of this invention.

In addition, the functional blocks as shown in FIG. 1 and FIG. 7 are mere examples, and they do not always correspond to actual program modules.

Figure 9:
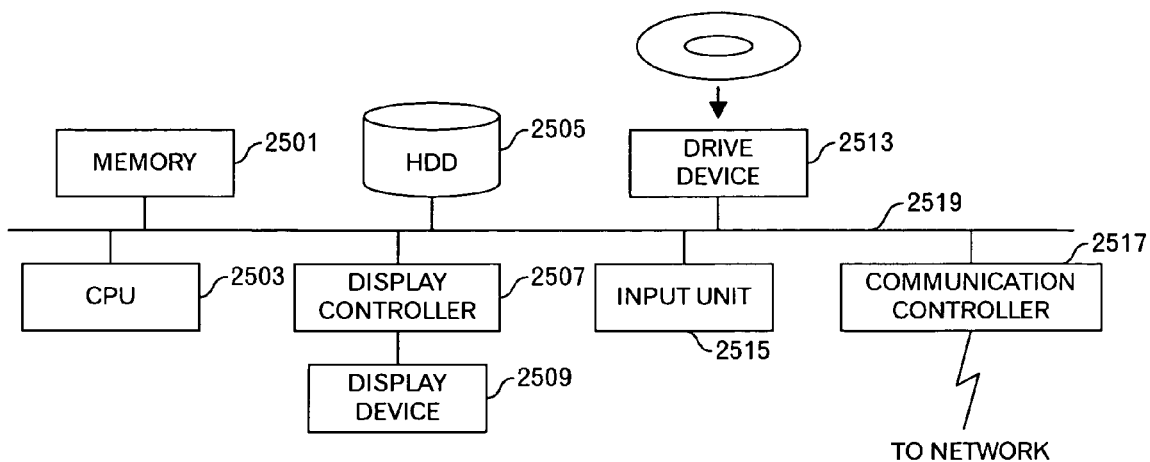
FIG. 9 is a functional block diagram of a computer.

In addition, the server, the information provider terminal, the information user terminal and the proxy are computer devices as shown in FIG. 9. That is, a memory 2501 (storage device), a CPU 2503 (processor), a hard disk drive (HDD) 2505, a display controller 2507 connected to a display device 2509, a drive device 2513 for a removal disk 2511, an input device 2515, and a communication controller 2517 for connection with a network are connected through a bus 2519 as shown in FIG. 28. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removal disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application program are systematically cooperated with each other, so that various functions as described above in details are realized.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. A data conversion method, comprising:

reading out contents data to be published, which includes text data, and identifying a character string whose output as text data should be avoided, from the read contents data;

converting the identified character string into substitution data other than said text data so as to maintain content of said identified character string;

generating publication contents data to maintain publication content of said read contents data by using data other than said identified character string in said read contents data and said substitution data;

judging whether a transmission source of a contents data request is registered in a publication refusal list or is not registered in a publication approval list, upon receiving said contents data request;

upon detecting that said transmission source of said contents data request is registered in said publication refusal list or is not registered in said publication approval list, transmitting said publication contents data to said transmission source of said contents data request; and upon detecting that said transmission source of said contents data request is not registered in said publication refusal list or is registered in said publication approval list, transmitting said contents data to said transmission source of said contents data request.

2. The data conversion method as set forth in claim 1, wherein said reading and identifying include extracting personal information of a predetermined type.

3. The data conversion method as set forth in claim 1, wherein said reading and identifying include extracting at least a part of a character string of a predetermined type.

4. The data conversion method as set forth in claim 1, wherein said substitution data is image data or voice data representing said identified character string.

5. The data conversion method as set forth in claim 1, wherein said substitution data is image data representing the identified character string, and said image data includes an image having cursive or irregular fonts corresponding to characters included in said identified character string.

6. The data conversion method as set forth in claim 1, wherein said publication contents data includes reference data to said substitution data.

7. The data conversion method as set forth in claim 1, wherein said publication contents data includes data to display said substitution data in another window.

8. The data conversion method as set forth in claim 1, wherein said publication contents data is data to display a combination of said data other than said identified character string in said contents data and said substitution data.

9. A system, comprising:

an input contents storage device storing contents data;

a unit to read, from said input contents storage device, out contents data to be published, which includes text data, and identifies a character string whose output as text data should be avoided, from the read contents data;

a unit to convert the identified character string into substitution data other than said text data so as to maintain content of said identified character string;

a unit to generate publication contents data to maintain publication content of said read contents data by using data other than said identified character string in said read contents data and said substitution data a unit to judge whether a transmission source of a contents data request is registered in a publication refusal list or is not registered in a publication approval list, upon receiving said contents data request;

a unit to transmit, upon detecting that said transmission source of said contents data request is registered in said publication refusal list or is not registered in said publication approval list, said publication contents data to said transmission source of said contents data request; and a unit to transmit, upon detecting that said transmission source of said contents data request is not registered in said publication refusal list or is registered in said publication approval list, said contents data to said transmission source of said contents data request.

* * * * *